(12) United States Patent
Lee et al.

(10) Patent No.: US 7,499,236 B1
(45) Date of Patent: *Mar. 3, 2009

(54) CALIBRATING CORRELATION BETWEEN PES AND OFF-TRACK DISPLACEMENT BY PROCESSING HIGH FREQUENCY SIGNAL IN SPIRAL TRACK

(75) Inventors: Tehri S. Lee, San Jose, CA (US); Siri S. Weerasooriya, Campbell, CA (US); Harry S. Hvostov, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 600 days.

This patent is subject to a terminal disclaimer.

(21) Appl. No.: 11/101,910

(22) Filed: Apr. 8, 2005

Related U.S. Application Data

(63) Continuation-in-part of application No. 10/769,387, filed on Jan. 31, 2004, now Pat. No. 6,965,489.

(51) Int. Cl.
*G11B 21/02* (2006.01)
(52) U.S. Cl. ........................................................ 360/75
(58) Field of Classification Search ................... 360/75, 360/51, 78.07, 78.06
See application file for complete search history.

(56) References Cited

U.S. PATENT DOCUMENTS

| | | | |
|---|---|---|---|
| 5,576,906 A | 11/1996 | Fisher et al. | |
| 5,583,712 A | 12/1996 | Brunelle | |
| 5,668,679 A | 9/1997 | Swearingen et al. | |
| 5,754,352 A | 5/1998 | Behrens et al. | |
| 5,825,580 A | 10/1998 | Shibata | |
| 5,867,353 A | 2/1999 | Valent | |
| 6,078,461 A | 6/2000 | Smith et al. | |
| 6,091,564 A | 7/2000 | Codilian et al. | |
| 6,175,472 B1 | 1/2001 | Valent | |
| 6,191,906 B1 | 2/2001 | Buch | |
| 6,292,318 B1 | 9/2001 | Hayashi | |
| 6,304,407 B1 | 10/2001 | Baker et al. | |
| 6,411,453 B1 | 6/2002 | Chainer et al. | |
| 6,429,989 B1 | 8/2002 | Schultz et al. | |
| 6,466,385 B1 | 10/2002 | Umeda et al. | |
| 6,469,852 B1 | 10/2002 | Nakagawa | |
| 6,490,120 B1 * | 12/2002 | Burton et al. | 360/78.07 |
| 6,507,450 B1 | 1/2003 | Elliott | |

(Continued)

OTHER PUBLICATIONS

Notice of Allowance dated Jun. 28, 2005 from U.S. Appl. No. 10/769,387, 10 pages.

(Continued)

*Primary Examiner*—Fred Tzeng
(74) *Attorney, Agent, or Firm*—Howard H. Sheerin, Esq.

(57) ABSTRACT

A method is disclosed for writing product servo sectors to the disk of a disk drive by demodulating spiral tracks recorded on the disk. Each spiral track comprises a high frequency signal interrupted at a predetermined interval by a sync mark. The high frequency signal is demodulated into a plurality of servo burst signals, and a position error signal is generated from the servo burst signals. A correlation between the position error signal and an off-track displacement of a head is calibrated, for example, by moving the head radially over the disk until the servo burst signals attain a first predetermined relationship, and then calibrating the correlation in response to the corresponding position error signal.

16 Claims, 9 Drawing Sheets

U.S. PATENT DOCUMENTS

| | | | |
|---|---|---|---|
| 6,519,107 B1 | 2/2003 | Ehrlich et al. | |
| 6,587,293 B1 | 7/2003 | Ding et al. | |
| 6,704,156 B1 | 3/2004 | Baker et al. | |
| 6,738,205 B1 | 5/2004 | Moran et al. | |
| 6,771,443 B2 | 8/2004 | Szita et al. | |
| 6,937,431 B2 * | 8/2005 | Galloway | 360/78.06 |
| 6,965,489 B1 * | 11/2005 | Lee et al. | 360/75 |
| 6,985,316 B1 | 1/2006 | Liikanen et al. | |
| 6,987,636 B1 * | 1/2006 | Chue et al. | 360/75 |
| 6,989,954 B1 * | 1/2006 | Lee et al. | 360/75 |
| 7,016,134 B1 * | 3/2006 | Agarwal et al. | 360/51 |
| 7,054,083 B2 | 5/2006 | Ehrlich | |
| 7,068,459 B1 * | 6/2006 | Cloke et al. | 360/75 |
| 7,088,533 B1 | 8/2006 | Shepherd et al. | |
| 7,113,362 B1 | 9/2006 | Lee et al. | |

OTHER PUBLICATIONS

Notice of Allowance dated Oct. 7, 2005 from U.S. Appl. No. 10/946,965, 7 pages.

Notice of Allowance dated Jun. 16, 2006 from U.S. Appl. No. 11/208,358, 5 pages.

Office Action dated Jan. 19, 2006 from U.S. Appl. No. 11/208,358, 6 pages.

* cited by examiner

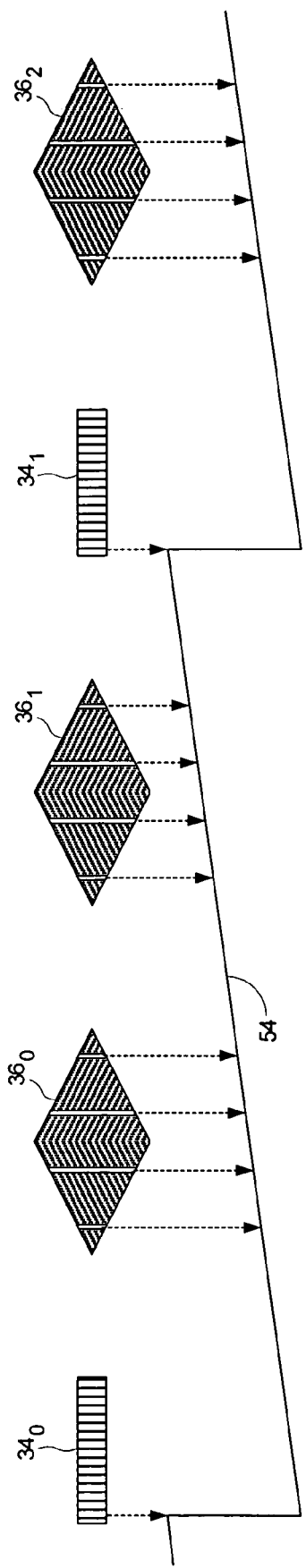
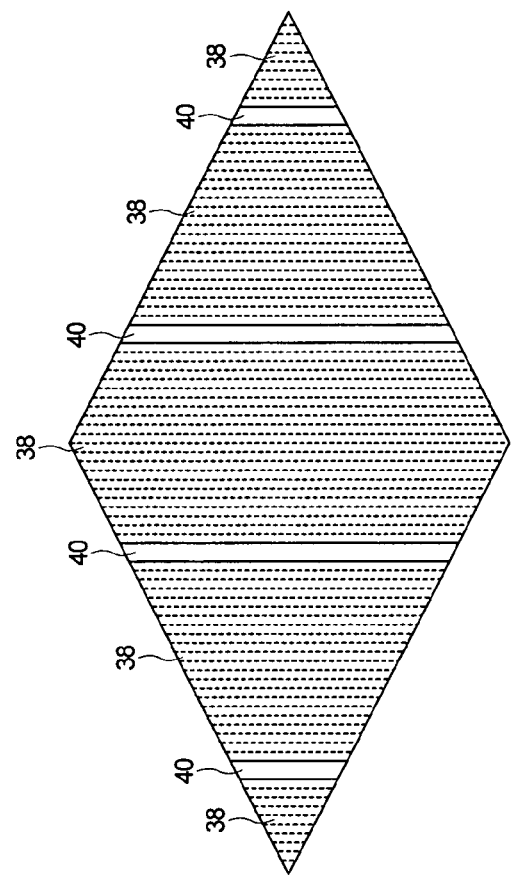
FIG. 3A
FIG. 3B $A=D; \quad PES = \frac{A-D}{A+D} = 0$ $B=D; \quad PES = \frac{A-D}{A+D} <> 0$

CALIBRATING CORRELATION BETWEEN PES AND OFF-TRACK DISPLACEMENT BY PROCESSING HIGH FREQUENCY SIGNAL IN SPIRAL TRACK

This application is a continuation-in-part of co-pending patent application Ser. No. 10/769,387 filed on Jan. 31, 2004.

BACKGROUND OF THE INVENTION

1. Field of the Invention

The present invention relates to disk drives for computer systems. More particularly, the present invention relates to calibrating correlation between PES and off-track displacement by processing high frequency signal in spiral track.

2. Description of the Prior Art

When manufacturing a disk drive, product servo sectors $2_0$-$2_N$ are written to a disk 4 which define a plurality of radially-spaced, concentric data tracks 6 as shown in the prior art disk format of FIG. 1. Each product servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. During normal operation the servo bursts 14 are processed by the disk drive in order to maintain a head over a centerline of a target track while writing or reading data. In the past, external servo writers have been used to write the product servo sectors $2_0$-$2_N$ to the disk surface during manufacturing. External servo writers employ extremely accurate head positioning mechanics, such as a laser interferometer, to ensure the product servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. The spiral tracks are written "open loop" by seeking the head from an outer diameter of the disk to an inner diameter of the disk. The disk drive calibrates acceleration/deceleration impulses to seek the head from the outer to inner diameter in a desired amount of time. Accurate radial positioning of the spiral tracks assumes the calibration process is accurate and that the calibrated acceleration/deceleration impulses will generate a repeatable response over multiple seeks. However, the calibration process will inevitably exhibit some degree of error and the dynamics of the disk drive will change between seeks inducing errors in the radial position of the spiral tracks. Dynamic errors which degrade the spiral tracks written during an open loop seek include vibration of the HDA, flutter and non-repeatable run-out of the disk and spindle bearings, stiction and non-repeatable run-out of the pivot bearings, windage on the head and arm, and flex circuit bias, windage and vibration. Errors in writing the spiral tracks will propagate to the product servo sectors, thereby degrading the operating performance of the disk drive and reducing the manufacturing yield.

In the '679 patent, each spiral track is written to the disk as a high frequency signal (with missing bits), wherein the position error signal (PES) for tracking is generated relative to time shifts in the detected location of the spiral tracks. In addition, the '679 patent generates a servo write clock by synchronizing a phase-locked loop (PLL) to the missing bits in the spiral tracks. In order to initially synchronize the PLL to the missing bits the head must servo accurately in a circular path since PLL phase error can occur due to actual timing errors or radial tracking errors. Conversely, PLL phase errors cause radial tracking errors making it difficult to simultaneously maintain the head in a circular path by servoing on the spiral tracks while attempting to synchronize the PLL to the missing bits.

There is, therefore, a need to improve the servo writing process for a disk drive by reducing the bottleneck and expense of external servo writers while maintaining adequate operating performance and manufacturing yield.

SUMMARY OF THE INVENTION

The present invention may be regarded as a method associated with a disk drive. The disk drive comprises control circuitry and a head disk assembly (HDA) comprising a disk, an actuator arm, a head connected to a distal end of the actuator arm. A voice coil motor rotates the actuator arm about a pivot to position the head radially over the disk. The disk comprises a plurality of spiral tracks, wherein each spiral track comprises a high frequency signal interrupted at a predetermined interval by a sync mark. The head internal to the disk drive is used to read the spiral tracks to generate a read signal. Burst demodulation circuitry demodulates the read signal representing the high frequency signal between the sync marks in one of the spiral tracks into a plurality of respective servo burst signals. The servo burst signals generated from reading the spiral track are processed to generate a position error signal (PES) used to maintain the head along a substantially circular target path. A correlation between the position error signal and an off-track displacement of the head is calibrated.

In one embodiment, the head internal to the disk drive is used to write product servo sectors along the circular target path, wherein each product servo sector comprises a plurality of servo bursts.

In another embodiment, the correlation between the position error signal and an off-track displacement of the head is calibrated by moving the head radially over the disk until the servo burst signals generated from reading the spiral tracks attain a first predetermined relationship, generating a first position error signal from the servo burst signals, and calibrating the correlation in response to the first position error signal.

In yet another embodiment, the burst demodulation circuitry comprises an integrator.

In still another embodiment, the correlation between the position error signal and the off-track displacement of the head is calibrated by further moving the head radially over the disk until the servo burst signals generated from reading the spiral tracks attain a second predetermined relationship, generating a second position error signal from the servo burst signals, calibrating the correlation in response to the first and second position error signals. In yet another embodiment, a first normalized scaling factor is computed as a ratio between a first expected head displacement and the first position error signal, a second normalized scaling factor is computed as a ratio between a second expected head displacement and the second position error signal, and the correlation is calibrated in response to the first and second normalized scaling factors. In one embodiment, the first normalized scaling factor is weighted using a first weight to generate a first weighted normalized scaling factor, the second normalized scaling factor is weighted using a second weight to generate a second weighted normalized scaling factor, wherein the second weight is different than the first weight, and the correlation is calibrated in response to the first and second weighted normalized scaling factors.

In one embodiment, the control circuitry within the disk drive comprises the burst demodulation circuitry, and in another embodiment, an external product servo writer comprises the burst demodulation circuitry.

The present invention may also be regarded as a disk drive comprising a disk having a plurality of spiral tracks, wherein each spiral track comprises a high frequency signal interrupted at a predetermined interval by a sync mark. A head is connected to a distal end of an actuator arm, and a voice coil motor rotates the actuator arm about a pivot to position the head radially over the disk. The disk drive further comprises burst demodulation circuitry. The head internal to the disk drive is used to read the spiral tracks to generate a read signal. The burst demodulation circuitry demodulates the read signal representing the high frequency signal between the sync marks in one of the spiral tracks into a plurality of respective servo burst signals. The servo burst signals generated from reading the spiral track are processed to generate a position error signal (PES) used to maintain the head along a substantially circular target path. A correlation between the position error signal and an off-track displacement of the head is calibrated.

BRIEF DESCRIPTION OF THE DRAWINGS

FIG. 3A shows an embodiment of the present invention wherein a servo write clock is synchronized by clocking a modulo-N counter so that it reaches terminal count at the frequency of sync marks in the reference servo sectors.

FIG. 3B shows an eye pattern generated by reading the spiral track, including the sync marks in the spiral track.

DESCRIPTION OF THE PREFERRED EMBODIMENTS

Figure 2A:
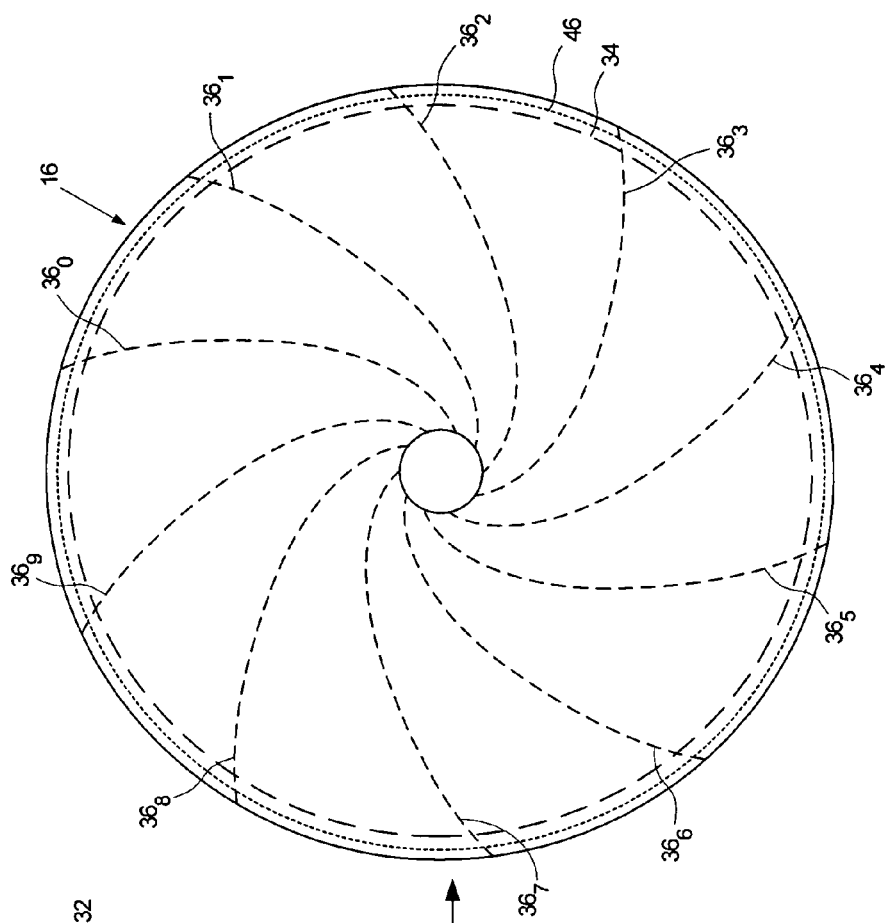
FIGS. 2A and 2B illustrate an embodiment of the present invention wherein an external spiral servo writer is used to write a plurality of reference servo sectors and a plurality of spiral tracks to the disk for use in writing product servo sectors to the disk.
Figure 2B:
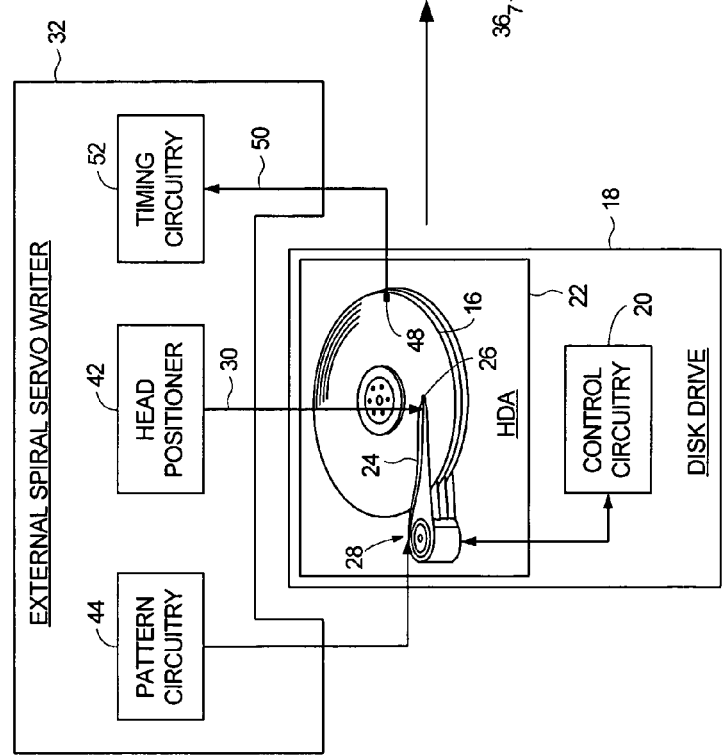

FIGS. 2A and 2B illustrate an embodiment of the present invention for writing product servo sectors to a disk 16 of a disk drive 18. The disk drive 18 comprises control circuitry 20 and a head disk assembly (HDA) 22 comprising the disk 16, an actuator arm 24, a head 26 connected to a distal end of the actuator arm 24, and a voice coil motor 28 for rotating the actuator arm 24 about a pivot to position the head 26 radially over the disk 16. A head positioning pin 30 of an external spiral servo writer 32 is inserted into the HDA 22, wherein the head positioning pin 30 for engaging the actuator arm 24. The external spiral servo writer 32 derives a radial location of the head 26 and actuates the head positioning pin 30 in response to the radial location of the head 26 in a closed loop system to rotate the actuator arm about the pivot in order to position the head radially over the disk 16 while writing a plurality of spiral tracks $36_0$-$36_N$, wherein each spiral track comprises a high frequency signal interrupted at a predetermined interval by a sync mark.

The head positioning pin 30 is then removed from the HDA 22, and the head 26 internal to the disk drive 18 is used to read the high frequency signal 38 in the spiral tracks $36_0$-$36_N$. A position error signal is generated to maintain the head 26 along a substantially circular target path while reading the sync marks 40 in the spiral tracks $36_0$-$36_N$ to generate a spiral sync mark detect signal, wherein a servo write clock is synchronized in response to the spiral sync mark detect signal. The servo write clock and the head 26 internal to the disk drive 18 are then used to write the product servo sectors along the circular target path.

Figure 1:
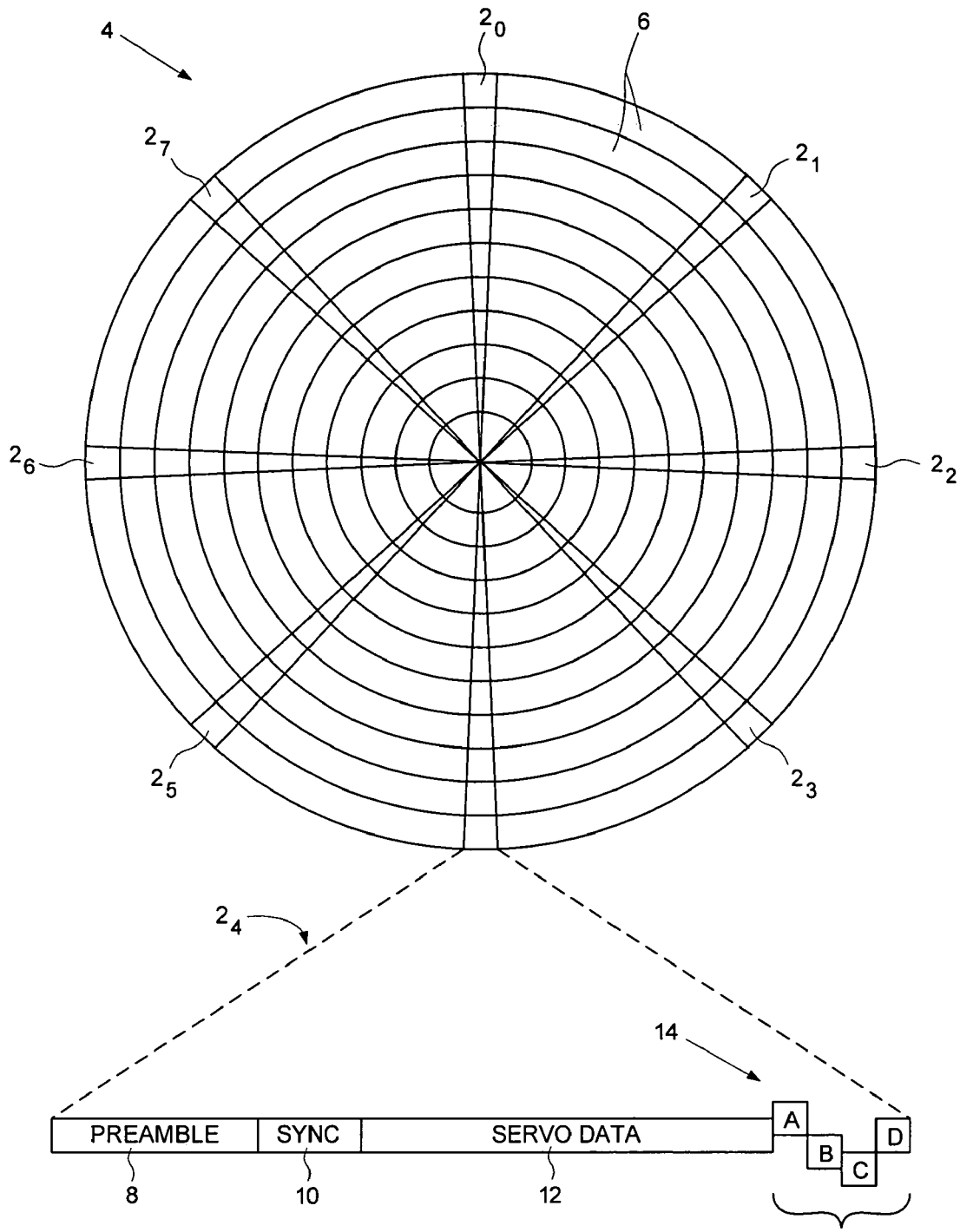
FIG. 1 shows a prior art disk format comprising a plurality of radially spaced, concentric tracks defined by a plurality of product servo sectors.

In one embodiment, the external spiral servo writer 32 also writes a plurality of reference servo sectors 34 (FIG. 2B) in a substantially circular reference path, each reference servo sector 34 comprising a sync mark 10 and a plurality of servo bursts 14 (FIG. 1). The servo bursts 14 in the reference servo sectors 34 are then read using the head 26 internal to the disk drive 18 to generate a position error signal used to maintain the head 26 along the circular reference path while reading the sync marks 10 in the reference servo sectors 34 to generate a reference sync mark detect signal which is used to initially synchronize the servo write clock.

In the embodiment of FIG. 2A, the external spiral servo writer 32 comprises a head positioner 42 for actuating the head positioning pin 30 using sensitive positioning circuitry, such as a laser interferometer. Pattern circuitry 44 generates the data sequence written to the disk 16 for the reference servo sectors 34 and the spiral tracks $36_0$-$36_N$. The external spiral servo writer 32 writes a clock track 46 (FIG. 2B) at an outer diameter of the disk 16, and a clock head 48 is inserted into the HDA 22 for reading the clock track 46 to generate a clock signal 50. Timing circuitry 52 in the external spiral servo writer 32 processes the clock signal 50 to enable the pattern circuitry 44 at the appropriate time so that the reference servo sectors 34 and spiral tracks $36_0$-$36_N$ are written at the appropriate circumferential location. The clock signal 50 also enables the pattern circuitry 44 to write the sync marks 40 (FIG. 3B) within the spiral tracks $36_0$-$36_N$ at the same circumferential location from the outer diameter to the inner diameter of the disk 16. As described below with reference to FIG. 4, the constant interval between sync marks 40 (independent of the radial location of the head 26) enables the servo write clock to maintain synchronization.

In the embodiment of FIG. 2A, the entire disk drive 18 is shown as being inserted into the external spiral servo writer 32. In an alternative embodiment, only the HDA 22 is inserted into the external spiral servo writer 32.

After the external spiral servo writer 32 writes the reference servo sectors 34 and the spiral tracks $36_0$-$36_N$ to the disk 16, the head positioning pin 30 and clock head 48 are removed from the HDA 22 and the product servo sectors are written to the disk 16. In one embodiment, the control circuitry 20 within the disk drive 18 is used to process the reference servo sectors 34 and spiral tracks $36_0$-$36_N$ in order to write the product servo sectors to the disk 16. In an alternative embodiment described below with reference to FIGS. 7 and 8, an external product servo writer is used to process the reference servo sectors 34 and spiral tracks $36_0$-$36_N$ in order to write the product servo sectors to the disk 16 during a "fill operation".

At the beginning of the fill operation, the reference servo sectors 34 are processed in order to synchronize the servo write clock. The reference servo sectors 34 are processed similar to conventional product servo sectors. The circumferential location of the reference servo sectors 34 is first determined by searching for the sync mark 10 asynchronously. Once a sync mark 10 is detected, the reference servo sectors 34 are detected synchronously by synchronizing a read clock to the preamble 8 (FIG. 1) preceding the sync mark 10. The servo bursts 14 in the reference servo sectors 34 are also demodulated in a conventional manner to generate a position error signal (PES) for use in maintaining (tracking) the head 26 along a circumferential path while reading the reference servo sectors 34. In one embodiment, several tracks of reference servo sectors 34 are written to the disk 16 to facilitate finding and tracking the reference servo sectors 34.

FIG. 3A shows an embodiment of the present invention wherein two spiral tracks are written between each reference servo sector (e.g., spiral tracks $36_0$ and $36_1$ written between reference servo sectors $34_0$ and $34_1$). Also shown in FIG. 3A is a saw-tooth waveform 54 representing the value of a modulo-N counter. The modulo-N counter is clocked by the servo write clock, and the frequency of the servo write clock is adjusted until the modulo-N counter reaches terminal count synchronous with detecting the sync mark 10 in the reference servo sector 34. The servo write clock may be generated using any suitable circuitry. In one embodiment, the servo write clock is generated using a phase locked loop (PLL). As each sync mark 10 in the reference servo sectors 34 is detected, the value of the modulo-N counter represents the phase error for adjusting the PLL. Once the modulo-N counter reaches terminal count substantially synchronous with detecting the sync marks 10 in the reference servo sectors 34, the servo write clock is coarsely locked to the desired frequency for writing the product servo sectors to the disk.

After synchronizing the servo write clock in response to the reference servo sectors, the spiral tracks $36_0$-$36_N$ are read to generate the PES signal for tracking as well as to maintain synchronization of the servo write clock. FIG. 3B illustrates an "eye" pattern in the read signal that is generated when the head 26 passes over a spiral track 36. The read signal representing the spiral track comprises high frequency transitions 38 interrupted by sync marks 40. When the head 26 moves in the radial direction, the eye pattern will shift (left or right) while the sync marks 40 remain fixed. The shift in the eye pattern (detected from the high frequency signal 38) relative to the sync marks 40 provides the off-track information for servoing the head 26.

The sync marks 40 in the spiral tracks $36_0$-$36_N$ may comprise any suitable pattern, and in one embodiment, a pattern that is substantially shorter than the sync mark 10 in the reference servo sectors 34. Referring again to FIG. 3A, when the sync marks 40 in the spiral tracks $36_0$-$36_N$ are detected, the value of the modulo-N counter is compared to an expected value, and the resulting error represents the phase error for adjusting the PLL that generates the servo write clock. In one embodiment, the PLL is updated when any one of the sync marks 40 within the eye pattern is detected. In this manner the multiple sync marks 40 in each eye pattern (each spiral track crossing) provides redundancy so that the PLL is still updated if one or more of the sync marks 40 are missed due to noise in the read signal.

In one embodiment, the servo write clock is further synchronized by generating a timing recovery measurement from the high frequency signal 38 between the sync marks 40 in the spiral tracks $36_0$-$36_N$. Synchronizing the servo write clock to the high frequency signal 38 helps maintain proper radial alignment (phase coherency) of the Gray coded track addresses in the product servo sectors. The timing recovery measurement may be generated in any suitable manner. In one embodiment, the servo write clock is used to sample the high frequency signal 38 and the signal sample values are processed to generate the timing recovery measurement. The timing recovery measurement adjusts the phase of the servo write clock (PLL) so that the high frequency signal 38 is sampled synchronously. In this manner, the sync marks 40 provide a coarse timing recovery measurement and the high frequency signal 38 provides a fine timing recovery measurement for maintaining synchronization of the servo write clock.

Figure 4:
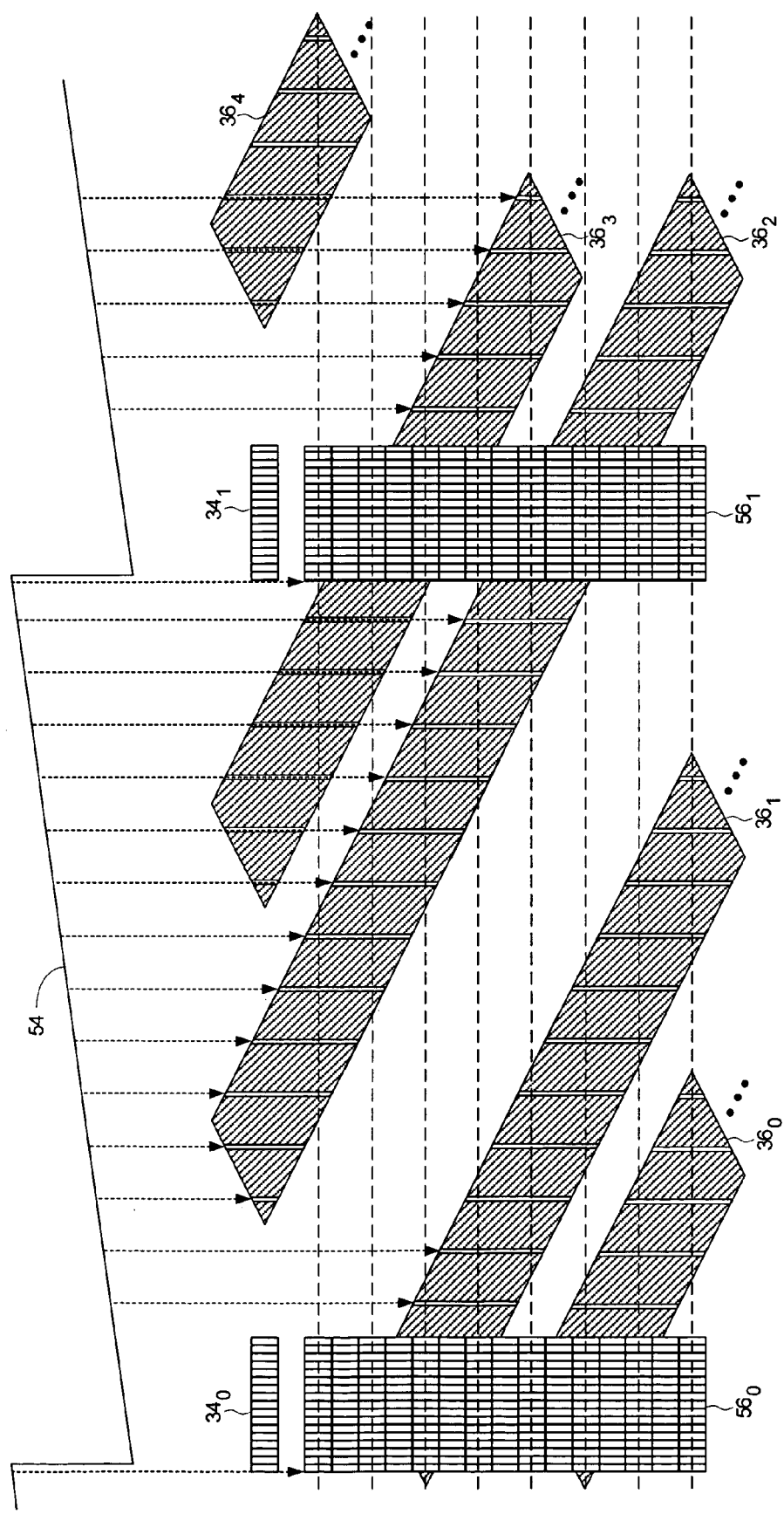
FIG. 4 illustrates an embodiment of the present invention wherein synchronization of the servo write clock is maintained from a coarse timing recovery measurement generated in response to the sync marks recorded in the spiral tracks and a fine timing recovery measurement generated in response to the high frequency signal in the spiral tracks.

FIG. 4 illustrates how the product servo sectors $56_0$-$56_N$ are written to the disk 16 after synchronizing the servo write clock using the reference servo sectors $34_0$-$34_N$. In the embodiment of FIG. 4, the dashed lines represent the centerlines of the data tracks. The sync marks in the spiral tracks $36_0$-$36_N$ are written so that there is a shift of two sync marks in the eye pattern (FIG. 3B) between data tracks. In an alternative embodiment, the sync marks in the spiral tracks $36_0$-$36_N$ are written so that there is a shift of N sync marks in the eye pattern between data tracks. In practice the width of the spiral tracks $36_0$-$36_N$ in the embodiment of FIG. 4 will be proximate the width of a data track. The spiral tracks $36_0$-$36_N$ are shown in FIG. 4 as being wider than the width of a data track for illustration purposes.

The PES for maintaining the head 26 along a servo track (tracking) may be generated from the spiral tracks $36_0$-$36_N$ in any suitable manner. In one embodiment, the PES is generated by detecting the eye pattern in FIG. 3B using an envelope detector and detecting a shift in the envelope relative to the sync marks 40. In one embodiment, the envelope is detected by integrating the high frequency signal 38 and detecting a shift in the resulting ramp signal. In an alternative embodiment disclosed below with reference to FIG. 5B, the high frequency signal 38 between the sync marks 40 in the spiral tracks are demodulated as servo bursts and the PES generated by comparing the servo bursts in a similar manner as with the servo bursts 14 in the reference servo sectors $34_0$-$34_N$.

Once the head 26 is tracking on a servo track, the product servo sectors $56_0$-$56_N$ are written to the disk using the servo write clock. Write circuitry is enabled when the modulo-N counter reaches a predetermined value, wherein the servo write clock clocks the write circuitry to write the product servo sector 56 to the disk. The spiral tracks 36$_0$-36$_N$ on the disk are processed in an interleaved manner to account for the product servo sectors 56$_0$-56$_N$ overwriting a spiral track. For example, when writing the product servo sectors 56$_1$ to the disk, spiral track 36$_2$ is processed initially to generate the PES tracking error and the timing recovery measurement. When the product servo sectors 56$_1$ begin to overwrite spiral track 36$_2$, spiral track 36$_3$ is processed to generate the PES tracking error and the timing recovery measurement.

Figure 5A:
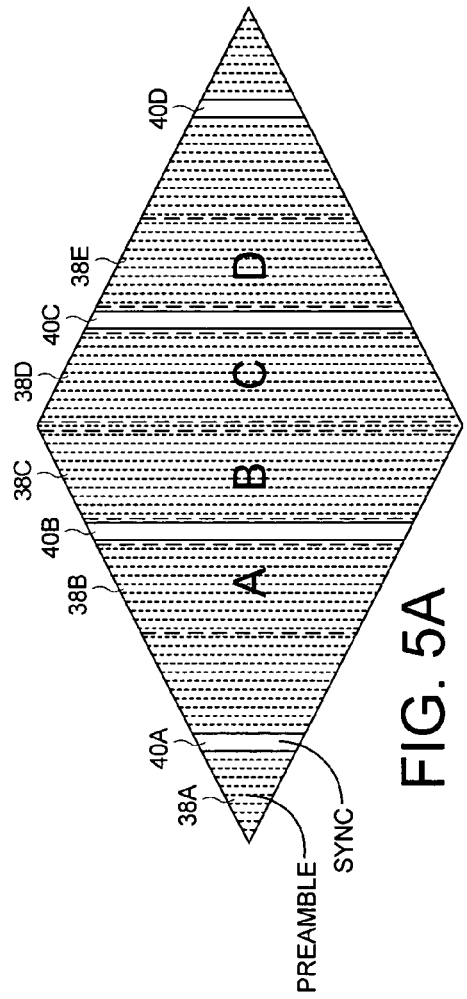
FIGS. 5A-5B illustrate how in one embodiment the control circuitry for demodulating the servo bursts in product servo sectors is also used to demodulate the high frequency signal in the spiral tracks as servo bursts to generate the PES for tracking.
Figure 5B:
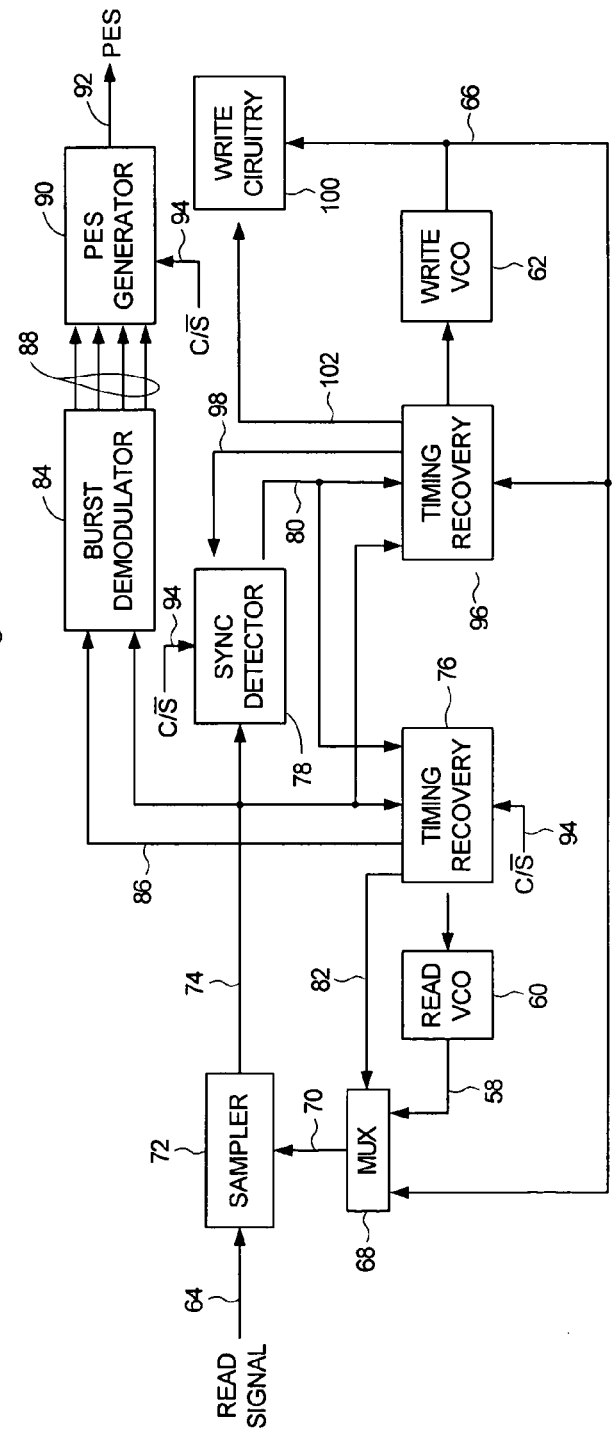

FIGS. 5A-5B illustrate an embodiment of the present invention wherein control circuitry for demodulating the servo bursts in prior art product servo sectors is also used to demodulate the high frequency signal 38 in the spiral tracks as servo bursts to generate the PES for tracking. FIG. 5A shows the eye pattern of FIG. 3B, which is processed similar to the prior art product servo sector shown in FIG. 1. The first segment 38A of the high frequency signal in the eye pattern of FIG. 5A is processed as a preamble similar to the preamble 8 in FIG. 1 for synchronizing a read clock 58 generated by a read voltage controlled oscillator (VCO) 60. The first sync mark 40A in the eye pattern is processed similar to the sync mark 10 in FIG. 1. The following segments 38B-38E of the high frequency signal in the eye pattern are demodulated as servo bursts used to generate the PES for tracking.

FIG. 5B shows example control circuitry for demodulating the prior art product servo sector of FIG. 1 as well as the eye pattern (FIG. 5A) of the spiral tracks 36. The embodiment employs a read VCO 60 and a write VCO 62. The read VCO 60 generates a read clock 58 for sampling the read signal 64 during normal operation when demodulating the product servo sectors 54 and user data recorded on the disk. The write VCO 62 generates the servo write clock 66 used to write the product servo sectors 54 to the disk during the fill operation. The write VCO 62 is also used to sample the read signal 64 when demodulating the servo bursts from the high frequency signal 38 in the spiral tracks 36.

In one embodiment, the read clock 58 is also used to sample the read signal 64 when reading the first segment 38A of the high frequency signal representing the preamble as well as the first sync mark 40A in the eye pattern (FIG. 5A) of the spiral tracks 36. The read clock 58 is selected by multiplexer 68 as the sampling clock 70 for sampling 72 the read signal 64. The read signal sample values 74 are processed by a first timing recovery circuit 76, which generates a timing recovery signal used to adjust the read VCO 60 until the read clock 58 is sampling the preamble 38A synchronously. Once locked onto the preamble 38A, a sync detector 78 is enabled for detecting the sync mark 40A in the eye pattern. When the sync detector 78 detects the sync mark 40A, it activates a sync detect signal 80. The first timing recovery circuit 76 responds to the sync detect signal 80 by configuring the multiplexer 68 over line 82 to select the servo write clock 66 as the sampling clock 70. The first timing recovery circuit 76 enables a timer for timing an interval between the sync mark 40A and the beginning of the A servo burst 38B in the eye pattern. When the timer expires, the first timing recovery circuit 76 enables a burst demodulator 84 over line 86 for demodulating the A, B, C and D servo bursts in the eye pattern from the read signal sample values 74.

In one embodiment, the burst demodulator 84 rectifies and integrates the rectified read signal sample values 74 representing the respective A, B, C and D servo bursts to generate respective servo burst signals 88 which correspond to integrating the A, B, C and D servo bursts 14 in the prior art product servo sector of FIG. 1. A PES generator 90 processes the servo burst signals 88 to generate a PES signal 92 used for tracking. The PES generator 90 may compare the servo burst signals 88 to generate the PES signal 92 using any suitable algorithm when demodulating the servo bursts in either the prior art product servo sectors of FIG. 1 or the eye pattern of FIG. 5A. In one embodiment, the PES signal 92 when reading the eye pattern of FIG. 5A is generated according to (A−D)/(A+D). In this embodiment, evaluating the servo bursts near the edges of the eye pattern increases the sensitivity of the PES measurement. This is because deviations in the radial location of the head 26 cause a more precipitous change in the servo burst values at the edges of the eye pattern as compared to the servo burst values near the center of the eye pattern.

In the embodiment of FIG. 5B, a control signal C/S 94 configures the first timing recovery circuit 76, the sync detector 78, and the PES generator 90 depending on whether the control circuitry is configured for demodulating the product servo sector (prior art product servo sector of FIG. 1) or the spiral tracks. The first timing recovery circuit 76 adjusts the timing between the detection of the sync mark (10 in FIGS. 1 and 40A in FIG. 5A) and the beginning of the A servo burst (14 in FIGS. 1 and 38B in FIG. 5A). The sync detector 78 adjusts the target sync pattern depending on whether the sync mark 10 in the product servo sector is being detected or the sync mark 40A in the eye pattern of the spiral track. The PES generator 90 adjusts the algorithm for comparing the servo burst signals 88 depending on whether the servo bursts 14 in the product servo sectors are being demodulated or the servo bursts 38B-38E in the eye pattern of the spiral track are being demodulated.

The control circuitry in the embodiment of FIG. 5B further comprises a second timing recovery circuit 96 for generating a timing recovery measurement that controls the write VCO 62 for generating the servo write clock 66. The second timing recovery circuit 96 comprises the modulo-N counter which is synchronized to the sync marks in the reference servo sectors 34 as shown in FIG. 3A. When servoing on the spiral tracks 36, the second timing recovery circuit 96 enables a sync mark detection window over line 98 commensurate with the modulo-N counter approaching a value corresponding to the expected occurrence of a sync mark 40 in a spiral track. When a sync mark 40 is actually detected over line 80, the second timing recovery circuit 96 generates a coarse timing recovery measurement as the difference between the expected value of the module-N counter and the actual value. When reading the high frequency signal 38 in the spiral tracks, the second timing recovery circuit 96 generates a fine timing recovery measurement using any suitable timing recovery algorithm. For example, the fine timing recovery measurement can be generated using a suitable timing gradient, a suitable trigonometric identity, or a suitable digital signal processing algorithm such as the Discrete Fourier Transform (DFT). The coarse and fine timing recovery measurements are combined and used to adjust the write VCO 62 in order to maintain synchronization of the servo write clock 66.

The servo write clock 66 is applied to write circuitry 100 used to write the product servo sectors 56 to the disk during the fill operation. The second timing recovery circuit 96 generates a control signal 102 for enabling the write circuitry 100 at the appropriate time so that the product servo sectors 56 are written at the appropriate circumferential location from the outer diameter of the disk to the inner diameter of the disk. In one embodiment, the control signal 102 enables the write circuitry 100 each time the module-N counter reaches a predetermined value so that the product servo sectors 56 form servo wedges as illustrated in FIG. 1 and FIG. 4.

Although the first timing recovery circuit 76 shown in FIG. 5B adjusts the frequency of the read clock 58, any suitable timing recovery technique may be employed. In an alternative embodiment, interpolated timing recovery is employed. With interpolated timing recovery the is read signal 64 is sampled asynchronously and interpolated to generate the synchronous sample values 74. In addition, the reference servo sectors 34 may comprise any suitable sync mark recorded at any suitable location within the reference servo sector. In one embodiment, the reference servo sector comprises multiple sync marks to provide redundancy similar to the eye pattern of FIG. 5A.

Figure 6A:
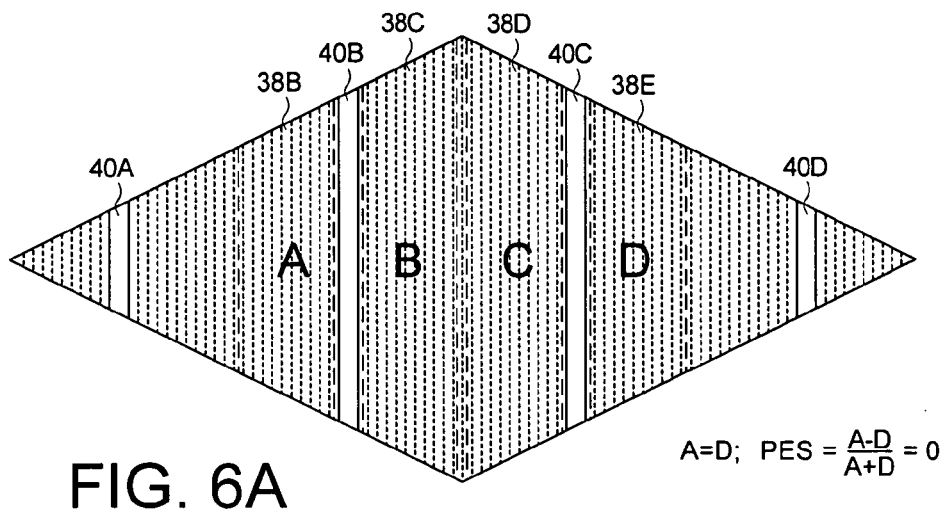
FIGS. 6A-6B show an embodiment of the present invention for calibrating the correlation between the PES generated from reading the spiral tracks and off-track displacement.
Figure 6B:
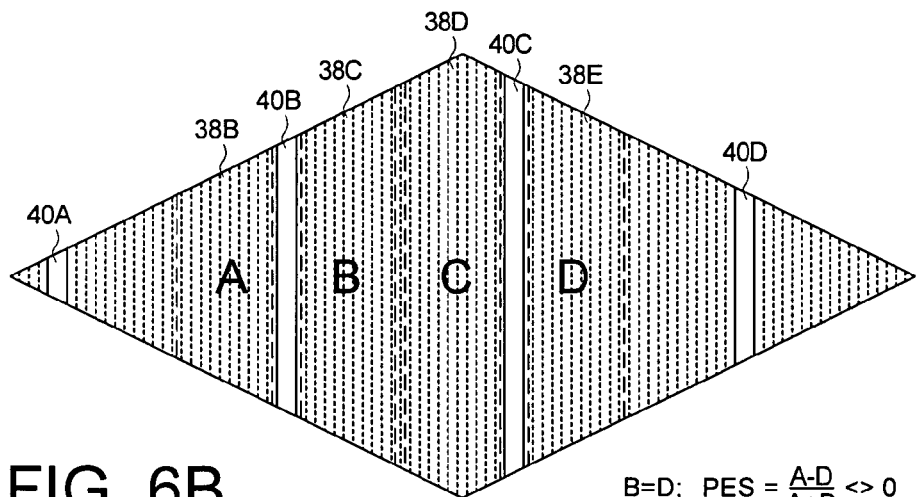

FIGS. 6A and 6B illustrate an embodiment of the present invention for calibrating the correlation between the PES generated from demodulating the spiral tracks 36 and the off-track displacement of the head 26. The segments 38B-38E of the high frequency signal in the spiral tracks 36 are demodulated as servo bursts to generate corresponding servo burst signals A, B, C and D. A PES is generated by comparing the servo burst signals according to any suitable algorithm, such as (A−D)/(A+D). As shown in FIG. 6A, when the head 26 is on track a predetermined relationship between the servo burst signals (e.g., A=D) generates a predetermined value for the PES (e.g., zero). The head 26 is then moved away from the center of the track until the servo burst signals reach a second predetermined relationship (e.g., B=D) as shown in FIG. 6B. When the servo burst signals reach the second predetermined relationship, the shift in the eye pattern relative to the sync marks 40A-40D is known and therefore the amount of off-track displacement is known. Measuring the PES when the servo burst signals reach the second predetermined relationship provides the correlation (assuming a linear relationship) between the PES and the amount of off-track displacement.

In one embodiment, a plurality of normalized scaling factors are computed as a ratio between the expected head displacement value and the PES for a number of different relationships between the servo burst signals. That is, the PES is measured at a plurality of different off-track displacements for the head wherein the servo burst signals reach a number of corresponding relationships (e.g., A=C, A=B, B=D ad C=D). A normalized scaling factor $Norm_i$ is then computed for the N corresponding relationships:

$$Norm_i = \frac{|ExpHeadDisp_i|}{|PES_i|}, \text{ for } i = 1, \ldots, N$$

In one embodiment, the normalized scaling factors are weighted by corresponding weights $w_1$-$w_N$ to generate a nominal scaling factor NomNorm:

$$NomNorm = w_1 \cdot Norm_1 + \ldots + w_N \cdot Norm_N$$

The nominal scaling factor NomNorm is then used to scale the PES while writing the product servo sectors to the disk, thereby achieving the desired off-track displacement measurement for servoing the head. In one embodiment, the weights $w_1$-$w_N$ are selected to de-emphasize the contribution of the corresponding normalized scaling factors that provide a less reliable correlation between off-track displacement and PES. That is, certain of the relationships of the servo burst signals (e.g., A=B and C=D) may provide a less reliable correlation between off-track displacement and PES, and therefore the corresponding weight is reduced to de-emphasize the corresponding normalized scaling factor in the computation of the nominal scaling factor NomNorm. In another embodiment, each normalized scaling factor $Norm_i$ is generated over a number of revolutions of the disk in order to average out noise from the PES measurement.

Figure 7:
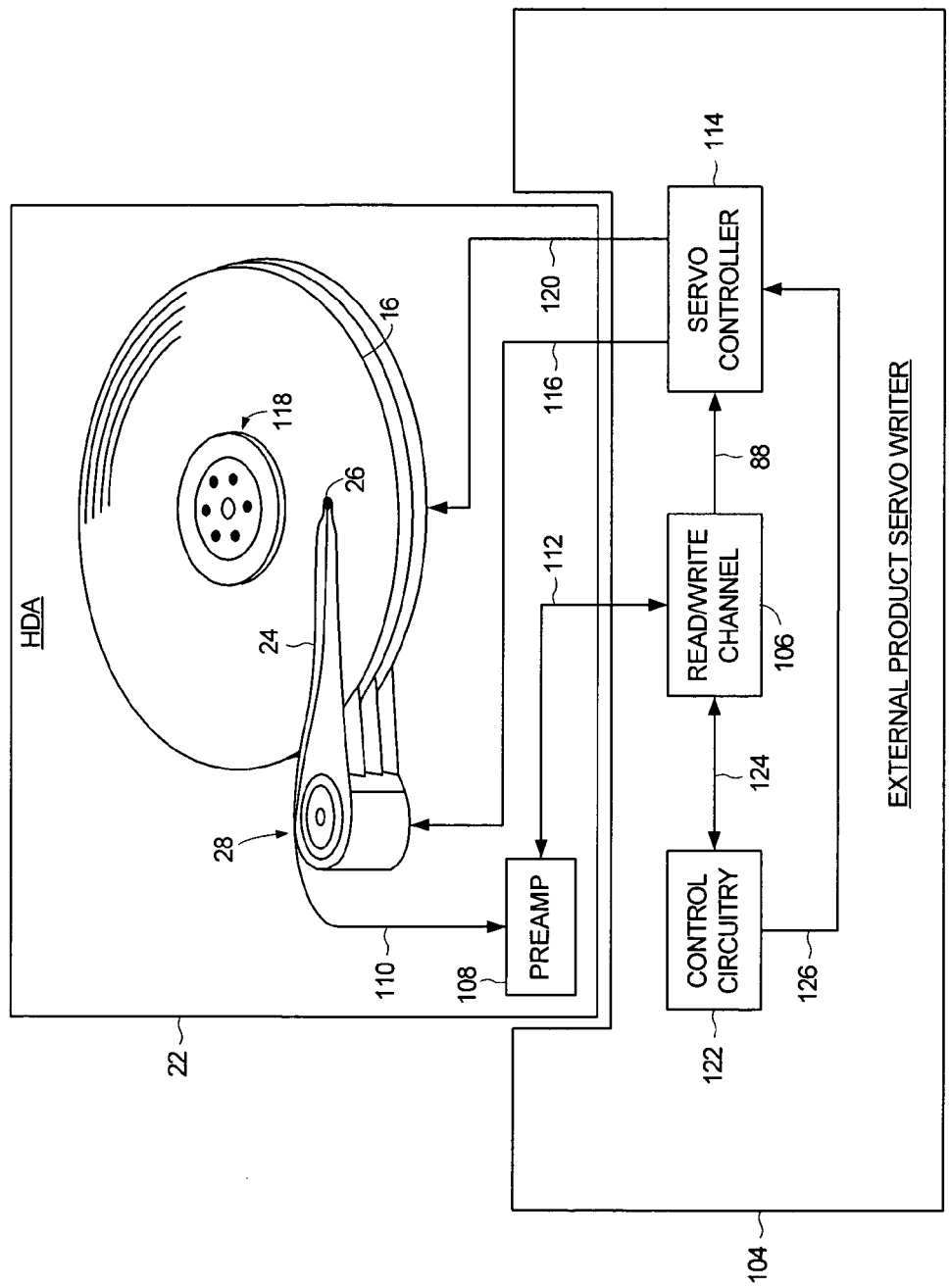
FIG. 7 shows an embodiment of the present invention wherein an external product servo writer is used to process the spiral tracks in order to write the product servo sectors to the disk.
Figure 8:
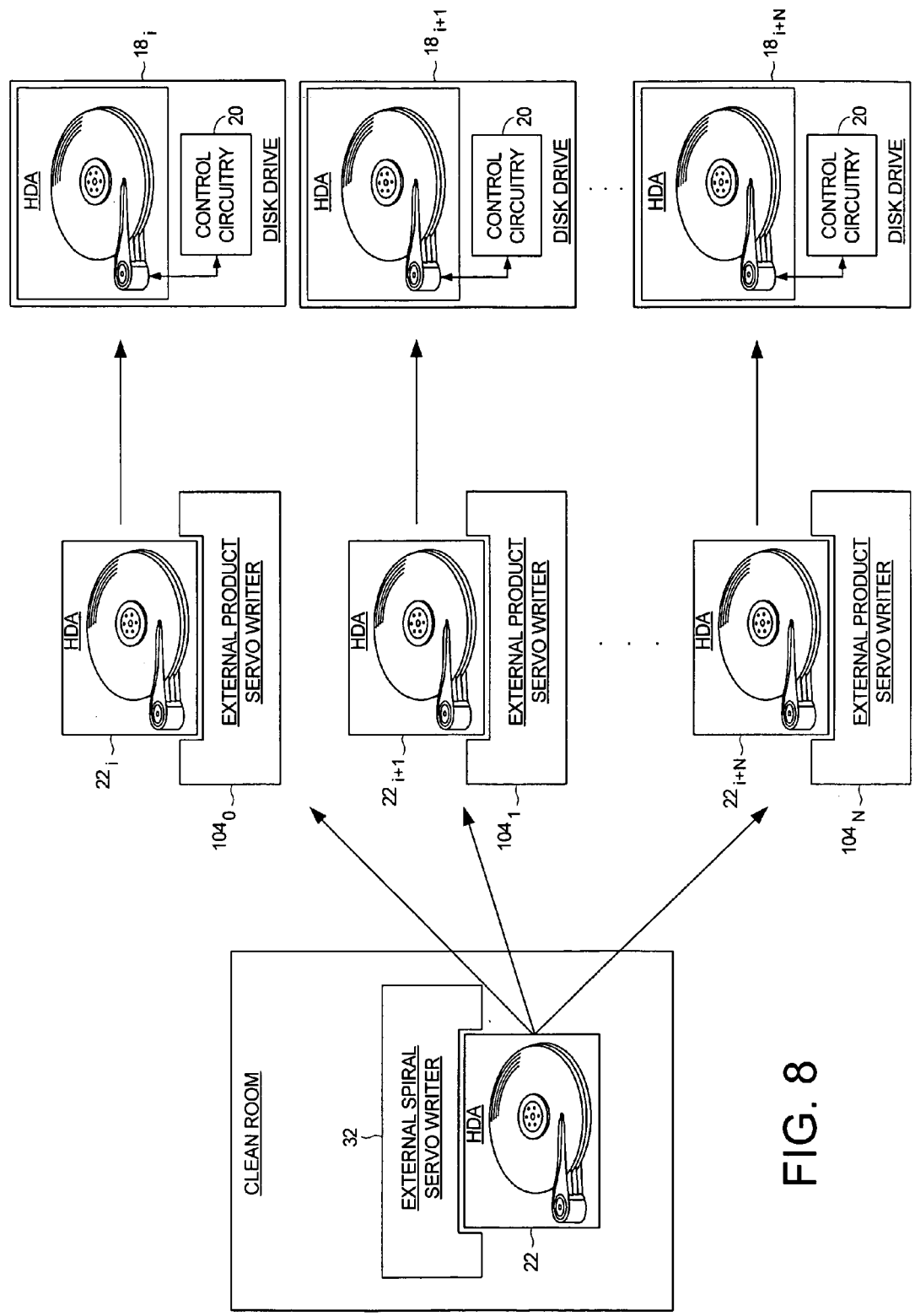
FIG. 8 shows an embodiment of the present invention wherein an external spiral servo writer is used to write the reference servo sectors and the spiral tracks, and a plurality of external product servo writers write the product servo sectors for the HDAs output by the external spiral servo writer.

FIG. 7 shows an embodiment of the present invention wherein after writing the reference servo sectors 34 and spiral tracks $36_0$-$36_N$ to the disk 16 (FIGS. 2A-2B), the HDA 22 is inserted into an external product servo writer 104 comprising suitable circuitry for reading and processing the reference servo sectors 34 and the spiral tracks $36_0$-$36_N$ in order to write the product servo sectors $56_0$-$56_N$ to the disk 16. The external product servo writer 104 comprises a read/write channel 106 for interfacing with a preamp 108 in the HDA 22. The preamp 108 amplifies a read signal emanating from the head 26 over line 110 to generate an amplified read signal applied to the read/write channel 106 over line 112. The read/write channel 106 comprises the circuitry of FIG. 5B for generating the servo burst signals 88 applied to a servo controller 114. The servo controller 114 processes the servo burst signals 88 to generate the PES 92. The PES 92 is processed to generate a VCM control signal applied to the VCM 28 over line 116 in order to maintain the head 26 along a circular path while writing the product servo sectors $56_0$-$56_N$. The servo controller 114 also generates a spindle motor control signal applied to a spindle motor 118 over line 120 to maintain the disk 16 at a desired angular velocity. Control circuitry 122 processes information received from the read/write channel 106 over line 124 associated with the spiral tracks (e.g., timing information) and provides the product servo sector data to the read/write channel 106 at the appropriate time. The product servo sector data is provided to the preamp 108, which modulates a current in the head 26 in order to write the product servo sectors $56_0$-$56_N$ to the disk 16. The control circuitry 122 also transmits control information over line 126 to the servo controller 114 such as the target servo track to be written. After writing the product servo sectors $56_0$-$56_N$ to the disk 16, the HDA 22 is removed from the external product servo writer 104 and a printed circuit board assembly (PCBA) comprising the control circuitry 20 (FIG. 2A) is mounted to the HDA 22.

Figure 9:
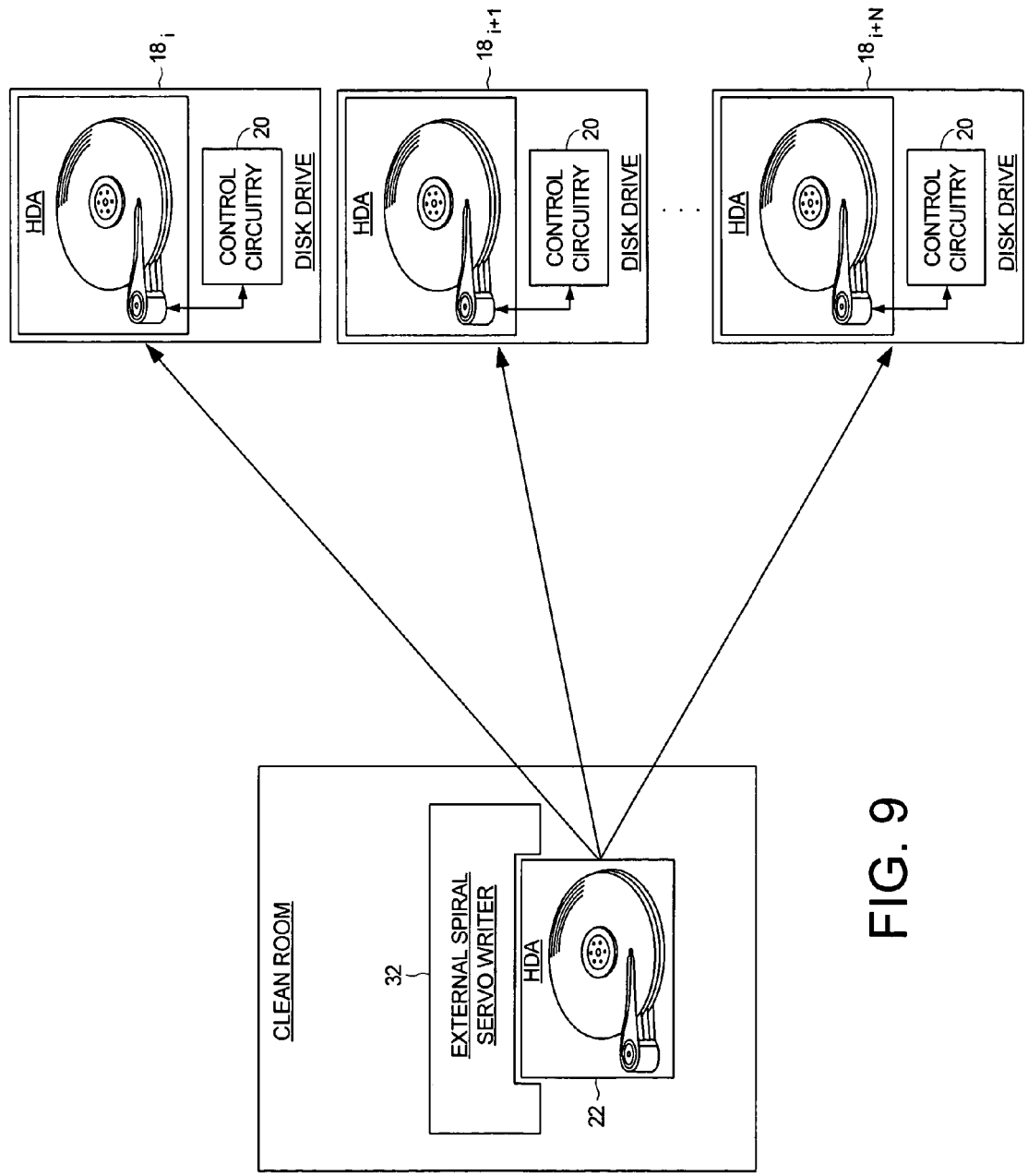
FIG. 9 shows an embodiment of the present invention wherein an external spiral servo writer is used to write the reference servo sectors and the spiral tracks, and the control circuitry within each product disk drive is used to write the product servo sectors.

In one embodiment, the external product servo writer 104 of FIG. 7 interfaces with the HDA 22 over the same connections as the control circuitry 20 to minimize the modifications needed to facilitate the external product servo writer 104. The external product servo writer 104 is less expensive than a conventional servo writer because it does not require a clean room or sophisticated head positioning mechanics. In an embodiment shown in FIG. 8, a plurality of external product servo writers $104_0$-$104_N$ process the HDAs $22_i$-$22_{i+N}$ output by an external spiral servo writer 32 in order to write the product servo sectors less expensively and more efficiently than a conventional servo writer. In an alternative embodiment shown in FIG. 9, an external spiral servo writer 32 is used to write the reference servo sectors and the spiral tracks, and the control circuitry 20 within each product disk drive $18_i$-$18_{i+N}$ is used to write the product servo sectors.

We claim:

1. A method associated with a disk drive, the disk drive comprising control circuitry and a head disk assembly (HDA) comprising a disk, an actuator arm, a head connected to a distal end of the actuator arm, and a voice coil motor for rotating the actuator arm about a pivot to position the head radially over the disk, the disk comprising a plurality of spiral tracks, each spiral track comprising a high frequency signal interrupted at a predetermined interval by a sync mark, the method comprising the steps of:

(a) using the head internal to the disk drive to read the spiral tracks to generate a read signal;

(b) using burst demodulation circuitry to demodulate the read signal representing the high frequency signal between the sync marks in one of the spiral tracks into a plurality of respective servo burst signals;

(c) processing the servo burst signals generated from reading the spiral track to generate a position error signal (PES) used to maintain the head along a substantially circular target path; and (d) calibrating a correlation between the position error signal and an off-track displacement of the head.

2. The method as recited in claim 1, further comprising the step of using the head internal to the disk drive to write product servo sectors along the circular target path, wherein each product servo sector comprises a plurality of servo bursts.

3. The method as recited in claim 1, wherein the step of calibrating the correlation between the position error signal and an off-track displacement of the head comprises the steps of:

moving the head radially over the disk until the servo burst signals generated from reading the spiral tracks attain a first predetermined relationship;

generating a first position error signal from the servo burst signals; and calibrating the correlation in response to the first position error signal.

4. The method as recited in claim 1, wherein the burst demodulation circuitry comprises an integrator.

5. The method as recited in claim 1, wherein the step of calibrating the correlation between the position error signal and the off-track displacement of the head further comprises the steps of:

moving the head radially over the disk until the servo burst signals generated from reading the spiral tracks attain a second predetermined relationship;

generating a second position error signal from the servo burst signals; and calibrating the correlation in response to the first and second position error signals.

6. The method as recited in claim 5, wherein the step of calibrating the correlation between the position error signal and the off-track displacement of the head further comprises the steps of:

computing a first normalized scaling factor as a ratio between a first expected head displacement and the first position error signal;

computing a second normalized scaling factor as a ratio between a second expected head displacement and the second position error signal; and calibrating the correlation in response to the first and second normalized scaling factors.

7. The method as recited in claim 6, wherein the step of calibrating the correlation between the position error signal and the off-track displacement of the head further comprises the steps of:

weighting the first normalized scaling factor using a first weight to generate a first weighted normalized scaling factor;

weighting the second normalized scaling factor using a second weight to generate a second weighted normalized scaling factor, wherein the second weight is different than the first weight; and calibrating the correlation in response to the first and second weighted normalized scaling factors.

8. The method as recited in claim 1, wherein the control circuitry within the disk drive comprises the burst demodulation circuitry.

9. The method as recited in claim 1, wherein an external product servo writer comprises the burst demodulation circuitry.

10. A disk drive comprising:

(a) a disk comprising a plurality of spiral tracks, wherein each spiral track comprises a high frequency signal interrupted at a predetermined interval by a sync mark;

(b) an actuator arm;

(c) a head connected to a distal end of the actuator arm;

(d) a voice coil motor for rotating the actuator arm about a pivot to position the head radially over the disk;

(e) burst demodulation circuitry; and (f) control circuitry for:

using the head internal to the disk drive to read the spiral tracks to generate a read signal;

using the burst demodulation circuitry to demodulate the read signal representing the high frequency signal between the sync marks in one of the spiral tracks into a plurality of respective servo burst signals;

processing the servo burst signals generated from reading the spiral track to generate a position error signal (PES) used to maintain the head along a substantially circular target path;

calibrating a correlation between the position error signal and an off-track displacement of the head.

11. The disk drive as recited in claim 10, wherein the control circuitry for using the head internal to the disk drive to write product servo sectors along the circular target path, wherein each product servo sector comprises a plurality of servo bursts.

12. The disk drive as recited in claim 10, wherein the control circuitry for calibrating the correlation between the position error signal and an off-track displacement of the head by:

moving the head radially over the disk until the servo burst signals generated from reading the spiral tracks attain a first predetermined relationship;

generating a first position error signal from the servo burst signals; and calibrating the correlation in response to the first position error signal.

13. The disk drive as recited in claim 10, wherein the burst demodulation circuitry comprises an integrator.

14. The disk drive as recited in claim 10, wherein the control circuitry calibrates the correlation between the position error signal and the off-track displacement of the head by further:

moving the head radially over the disk until the servo burst signals generated from reading the spiral tracks attain a second predetermined relationship;

generating a second position error signal from the servo burst signals; and calibrating the correlation in response to the first and second position error signals.

15. The disk drive as recited in claim 14, wherein the control circuitry calibrates the correlation between the position error signal and the off-track displacement of the head by further:

computing a first normalized scaling factor as a ratio between a first expected head displacement and the first position error signal;

computing a second normalized scaling factor as a ratio between a second expected head displacement and the second position error signal; and calibrating the correlation in response to the first and second normalized scaling factors.

16. The disk drive as recited in claim 15, wherein the control circuitry calibrates the correlation between the position error signal and the off-track displacement of the head by further:

weighting the first normalized scaling factor using a first weight to generate a first weighted normalized scaling factor;

weighting the second normalized scaling factor using a second weight to generate a second weighted normalized scaling factor, wherein the second weight is different than the first weight; and calibrating the correlation in response to the first and second weighted normalized scaling factors.

\* \* \* \* \*